(12) United States Patent
Keelan et al.

(10) Patent No.: US 8,526,754 B2
(45) Date of Patent: Sep. 3, 2013

(54) SYSTEM FOR ENHANCING DEPTH OF FIELD WITH DIGITAL IMAGE PROCESSING

(75) Inventors: Brian Keelan, Boulder Creek, CA (US); Dan Lelescu, Morgan Hill, CA (US)

(73) Assignee: Aptina Imaging Corporation, George Town (KY)

( * ) Notice: Subject to any disclaimer, the term of this patent is extended or adjusted under 35 U.S.C. 154(b) by 1088 days.

(21) Appl. No.: 12/474,215

(22) Filed: May 28, 2009

(65) Prior Publication Data

US 2010/0303373 A1 Dec. 2, 2010

(51) Int. Cl.
*G06K 9/40* (2006.01)

(52) U.S. Cl.
USPC ........... 382/255; 250/201; 250/231; 324/307; 324/309; 345/419; 345/413; 348/222.1; 348/335; 348/345; 348/348; 348/352; 382/108; 382/129; 382/131; 382/254; 382/260; 382/261; 382/284

(58) Field of Classification Search
None
See application file for complete search history.

(56) References Cited

U.S. PATENT DOCUMENTS

| | | | | |
|---|---|---|---|---|
| 5,282,045 | A * | 1/1994 | Mimura et al. | 348/352 |
| 5,644,612 | A * | 7/1997 | Moorman et al. | 378/98.2 |
| 5,706,394 | A * | 1/1998 | Wynn | 704/219 |
| 5,799,111 | A * | 8/1998 | Guissin | 382/254 |
| 5,873,830 | A * | 2/1999 | Hossack et al. | 600/447 |
| 6,083,168 | A * | 7/2000 | Hossack et al. | 600/443 |
| 6,120,446 | A * | 9/2000 | Ji et al. | 600/437 |
| 6,148,113 | A * | 11/2000 | Wolverton et al. | 382/255 |
| 6,685,092 | B2 * | 2/2004 | Patel et al. | 235/454 |
| 6,731,823 | B1 * | 5/2004 | Gallagher et al. | 382/266 |
| 7,248,749 | B2 * | 7/2007 | Avinash et al. | 382/260 |
| 7,352,182 | B1 * | 4/2008 | Steckner | 324/309 |
| 7,440,590 | B1 * | 10/2008 | Hassebrook et al. | 382/108 |
| 7,719,598 | B2 * | 5/2010 | Ortyn et al. | 348/335 |
| 8,131,097 | B2 * | 3/2012 | Lelescu et al. | 382/254 |
| 2003/0228065 | A1 * | 12/2003 | Kaltschmidt | 382/260 |
| 2004/0173737 | A1 * | 9/2004 | Shimomura et al. | 250/231.13 |
| 2005/0001617 | A1 * | 1/2005 | Busse | 324/307 |
| 2005/0025377 | A1 * | 2/2005 | Avinash et al. | 382/260 |
| 2005/0036702 | A1 * | 2/2005 | Yang et al. | 382/254 |
| 2005/0175228 | A1 * | 8/2005 | Elashoff et al. | 382/129 |

(Continued)

OTHER PUBLICATIONS

Lelescu et al. U.S. Appl. No. 12/128,234, filed May 28, 2008.

(Continued)

*Primary Examiner* — Tsung-Yin Tsai
(74) *Attorney, Agent, or Firm* — Treyz Law Group; G. Victor Treyz; David C. Kellogg (57) ABSTRACT

An electronic device may have a digital image sensor for capturing an image and may have storage and processing circuitry for processing the image to produce a corresponding enhanced depth-of-field image. Multiple image areas, within a given image may be processed. As each image area is processed, a signal-to-noise ratio may be computed. A kernel parameter characteristic curve may be used to select values to be used for kernel parameters for each image area based on the computed signal-to-noise ratio for that image area. Kernels may be generated for each image area and the generated kernels may be convolved with their respective image areas to modify the image areas. This allows each image area to be selectively sharpened or smoothed based on its signal-to-noise ratio. Image areas with low and high signal-to-noise ratios may be sharpened less those with moderate signal-to-noise ratios to enhance depth of field in the image.

7 Claims, 6 Drawing Sheets

(56) References Cited

U.S. PATENT DOCUMENTS

| | | | |
|---|---|---|---|
| 2006/0061690 A1* | 3/2006 | De Haan et al. | 348/625 |
| 2006/0222097 A1* | 10/2006 | Gupta et al. | 375/260 |
| 2007/0024614 A1* | 2/2007 | Tam et al. | 345/419 |
| 2007/0146873 A1* | 6/2007 | Ortyn et al. | 359/386 |
| 2007/0236567 A1* | 10/2007 | Pillman et al. | 348/143 |
| 2008/0012955 A1* | 1/2008 | Johnson et al. | 348/222.1 |
| 2008/0114255 A1* | 5/2008 | Schwartz et al. | 600/474 |
| 2008/0298661 A1* | 12/2008 | Huang | 382/131 |
| 2008/0304731 A1* | 12/2008 | Kimura | 382/131 |
| 2009/0040364 A1* | 2/2009 | Rubner | 348/362 |
| 2009/0245688 A1* | 10/2009 | Robinson et al. | 382/284 |
| 2009/0297056 A1* | 12/2009 | Lelescu et al. | 382/261 |
| 2010/0271536 A1* | 10/2010 | Campbell | 348/345 |
| 2010/0303372 A1* | 12/2010 | Zhao et al. | 382/254 |
| 2011/0049242 A1* | 3/2011 | Vinogradov et al. | 235/462.42 |
| 2011/0133054 A1* | 6/2011 | Campbell | 250/201.2 |
| 2012/0281132 A1* | 11/2012 | Ogura et al. | 348/348 |

OTHER PUBLICATIONS

Chi et al. "Electronic imaging using a logarithmic asphere" Optics Letters, vol. 26, No. 12, pp. 875-877, Jun. 15, 2001.

Wilburn et al. "High Performance Imaging Using Large Camera Arrays." [online] <http://graphics.stanford.edu/papers/CameraArray/CameraArray_Sig05.pdf>, retrieved May 28, 2009.

Ng et al. "Light Field Photography with a Hand-held Plenoptic Camera." [online] <http://graphics.stanford.edu/papers/lfcamera/lfcamera-150dpi.pdf>, retrieved May 28, 2009.

Jong-Sen Lee "Digital Image Enhancement and Noise Filtering by Use of Local Statistic" IEEE Transactions on Pattern Analysis and Machine Intelligence, vol. PAMI-2, No. 2, pp. 165-168, Mar. 1980.

* cited by examiner

SYSTEM FOR ENHANCING DEPTH OF FIELD WITH DIGITAL IMAGE PROCESSING

BACKGROUND

The present invention relates to imaging systems and, more particularly, to imaging systems in which perceived depth-of-field can be enhanced by digital image processing.

Electronic devices such as cellular telephones are often provided with camera sensors. Users of these devices are increasingly demanding the ability to capture high quality images. One factor in determining image quality is depth of field. The depth of field in an image is the range of distances over which the image appears to be in focus. In an image with a shallow depth of field, only objects that are close to the plane of focus will appear sharp and in focus. Objects in an image with a shallow depth of field image that lie in front of the plane of focus or behind the plane of focus will be blurred. Images with a large depth of field appear sharp over a greater distance. In this type of scenario, even objects that lie significantly off the plane of focus will appear to be sharp.

One way to obtain an image with a large depth of field involves reducing the aperture of the camera lens. This process, which is sometimes referred to as "stopping down" the lens can only be used in devices with adjustable-aperture lenses. The use of a small aperture to enhance depth of field may also require the use of a long exposure time, which can lead to reductions in image quality due to camera shake or subject motion.

Another way in which to obtain images with enhanced depth of field involves the use of so-called extended depth of field (EDoF) lenses. EDoF systems are optimized to improve depth of field at the expense of peak image sharpness. Digital image processing techniques may be used to sharpen and smooth images captured with EDoF systems to improve perceived quality and thereby compensate for the reduction in sharpness that is imposed by the EDoF lens. Although such systems may be satisfactory in certain circumstances, the use of EDoF lenses poses challenges. For example, the manufacturing techniques used to produce EDoF lenses tend to increase the cost and complexity of imaging systems in which EDoF lenses are used.

Specialized cameras called "array cameras" that can manipulate depth of field through digital processing are available, but these cameras must process data from a grid made up of numerous independent image sensors. Array cameras can therefore be even more complex, costly, and bulky than cameras with EDoF lenses.

DETAILED DESCRIPTION

Figure 1:
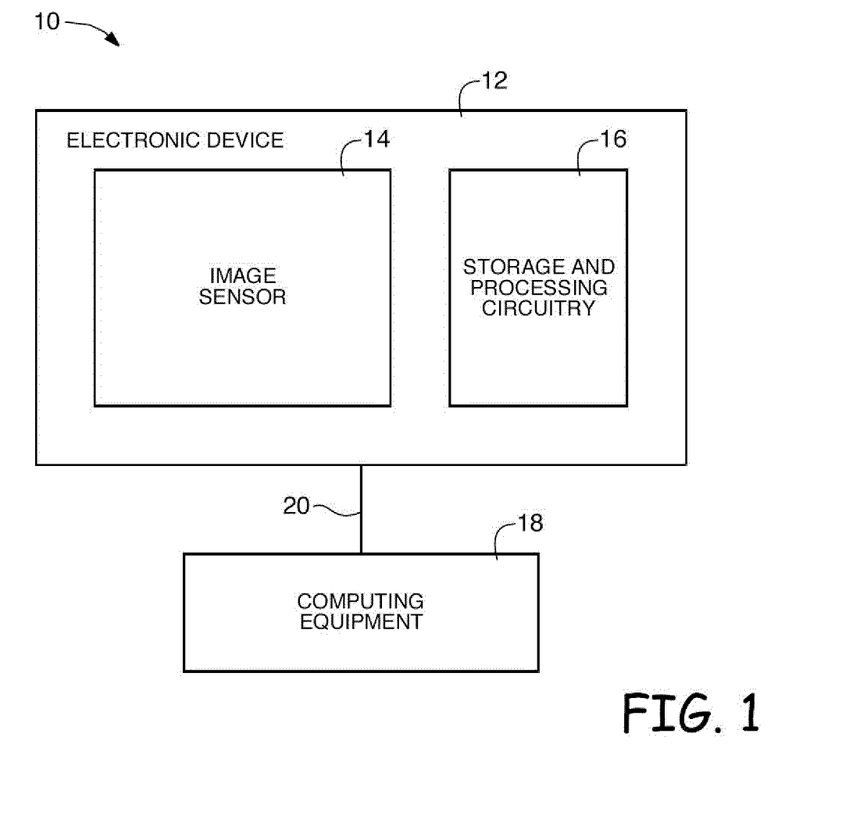
FIG. 1 is a diagram of an electronic device and computing equipment that may be used in producing images with enhanced depth of field in accordance with an embodiment of the present invention.

Digital image sensors are widely used in electronic devices. A system 10 in which an electronic device with a digital image sensor may be used is shown in FIG. 1. As shown in FIG. 1, electronic device 12 may include an image sensor 14. Electronic device 12 may be a digital camera, a computer, a cellular telephone, or other electronic device. Image sensor 14 may be part of a camera module that includes a lens or may be provided in a more complex electronic device that has a separate lens. During operation, the lens focuses light onto image sensor 14. The pixels in image sensor 14 include photosensitive elements that convert the light into digital data. Image sensors may have any number of pixels (e.g., hundreds or thousands or more). A typical image sensor may, for example, have millions, of pixels (e.g., megapixels). In high-end equipment, sensors with 10 megapixels or more are not uncommon.

Image data from image sensor 14 may be provided to storage and processing circuit 16. Storage and processing circuitry 16 may process the digital image data that has been captured with sensor 14. The processed image data may be maintained in storage. The processed image data may also be provided to external equipment. For example, the processed image data may be conveyed to computing equipment 18 over path 20. Computing equipment 18 may include a personal computer, a mainframe computer, a network of computers, a portable computer, a handheld computer, an embedded processor, or any other computing hardware (i.e., computing equipment with storage and processing circuitry). Equipment 18 may, for example, be a desktop or laptop computer that includes input-output devices such as a keyboard, mouse, and monitor. Processed images may be displayed on the monitor of equipment 18. Equipment 18 may also be used in performing image processing tasks. For example, equipment 18 may be used to run a photo editing application that implements depth of field enhancing techniques. Path 20 may be a wired or wireless path and may include analog and digital signal lines.

Storage and processing circuitry 16 may also be used to perform depth of field enhancement operations. Storage and processing circuitry 16 may include storage components such as memory integrated circuits, memory that is part of other integrated circuits such as microprocessors, digital-signal processors, or application specific integrated circuits, hard disk storage, solid state disk drive storage, removable media, or any other storage circuitry. Processing circuitry in storage and processing circuitry 16 may be based on one or more integrated circuits such as microprocessors, microcontrollers, digital signal processors, application-specific integrated circuits, image processors that are incorporated into camera modules, other hardware-based image processing circuits, combinations of these circuits, etc.

Using these resources, storage and processing circuitry 16 may receive a captured image from image sensor 14 and may process the captured image to produce a processed image. The processed image may have a depth of field (sometimes referred to as "perceived depth of field") that is larger than the depth of field of the captured image.

During processing, sharpening and smoothing (denoising) operations are applied to the captured image. The operations, which are sometimes simply referred to as "sharpening" operations, involve convolving an image processing kernel with the image.

The impact of sharpening operations as part of image restoration can be quantified using an image quality metric. One popular measure of sharpness is the so-called subjective quality factor (SQF). The subjective quality factor is the average percentage modulation transfer of an imaging system over an assumed bandpass of the human visual system (3-12 cycles per degree at the retina), integrated against the logarithm of spatial frequency. The impact of image sharpening algorithms on depth of field may be analyzed by examining SQF as a function of distance. Distance may be measured from the object being photographed (object distance). If desired, distance may be represented using the unitless quantity of hyperfocal distance divided by object distance.

A typical lens will exhibit maximum sharpness in its plane of focus (e.g., in fixed focus lenses, this is often at the hyperfocal distance). At larger and smaller distances, image sharpness decreases. By applying a sharpening algorithm, sharpness can be improved.

Figure 2:
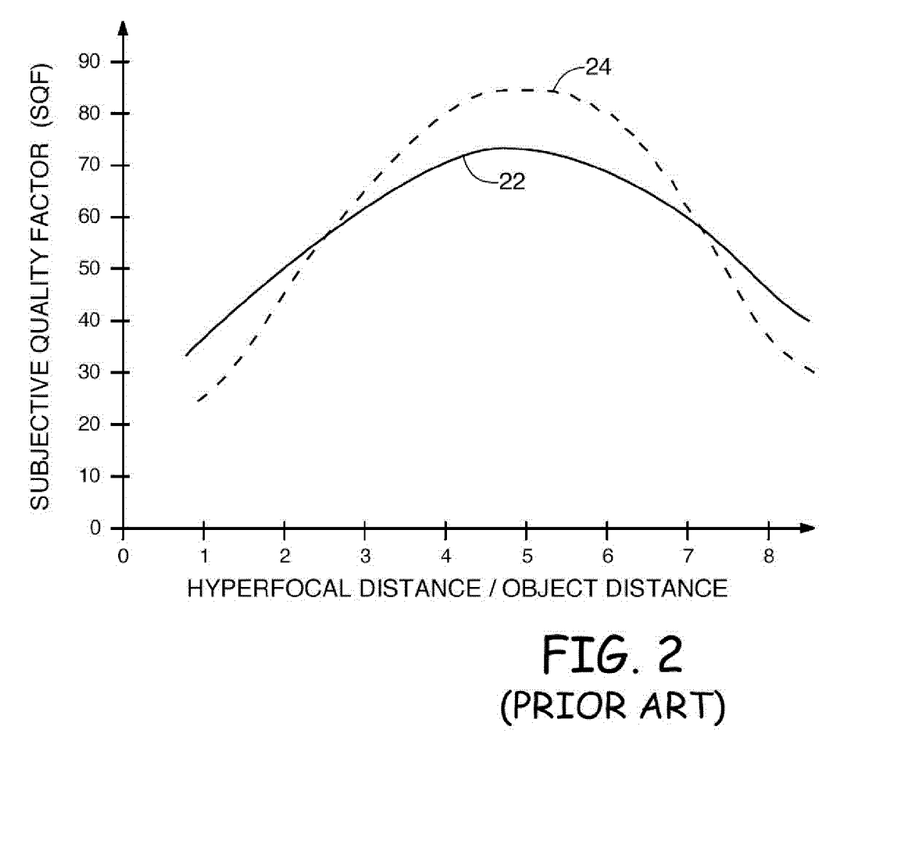
FIG. 2 is a diagram showing how conventional image processing techniques may tend to reduce depth of field in an image.

A conventional in-camera image processing operation is illustrated in FIG. 2. Initially, an image is captured that contains scene elements at a variety of distances. The sharpness (SQF) of image areas containing scene elements at various object distances is represented by solid line 22. To improve perceived image quality, in-camera sharpening is applied, leading to the SQF characteristic of dashed line 24.

With conventional image restoration algorithms, sharpening is applied most strongly in regions near the plane of focus (where the signal-to-noise ratio of the image is highest). Sharpening strength is reduced in the blurry portions of the image. As a result, conventional images may exhibit reduced depth of field following image sharpening operations. This is shown in the example of FIG. 2, where the image corresponding to unprocessed line 22 has a wider range of distances exhibiting sharpness within visual tolerance of the best focus (e.g., 10 SQF from peak) than does the image corresponding to sharpened line 24. Perceived depth of field is substantially determined by the sharpness at different distances relative to the highest sharpness apparent in an image (the highest sharpness occurs at best focus if there is subject matter present at best focus). This observation is consistent with the way in which depth of field tables and lens markings are calculated using the geometrical blur model, which considers only defocus, not the absolute sharpness at best focus.

To enhance depth of field during image processing operations, a reduced amount of sharpening may be applied in regions of an image with the greatest SQF. These portions of the image may be identified by calculating an inferred defocus metric for various portions of the image and sharpening or smoothing each portion of the image by an amount that depends on the calculated defocus metric for that image portion. Experimental results have indicated that there can be a good correlation between measured signal-to-noise ratio and subjective quality factor, which itself is correlated to defocus, so the inferred defocus metric for a given image area may be computed from the signal-to-noise ratio for that image area. Other inferred defocus metrics may be used if desired. The use of signal-to-noise ratio as the inferred defocus metric is merely illustrative.

Figure 3:
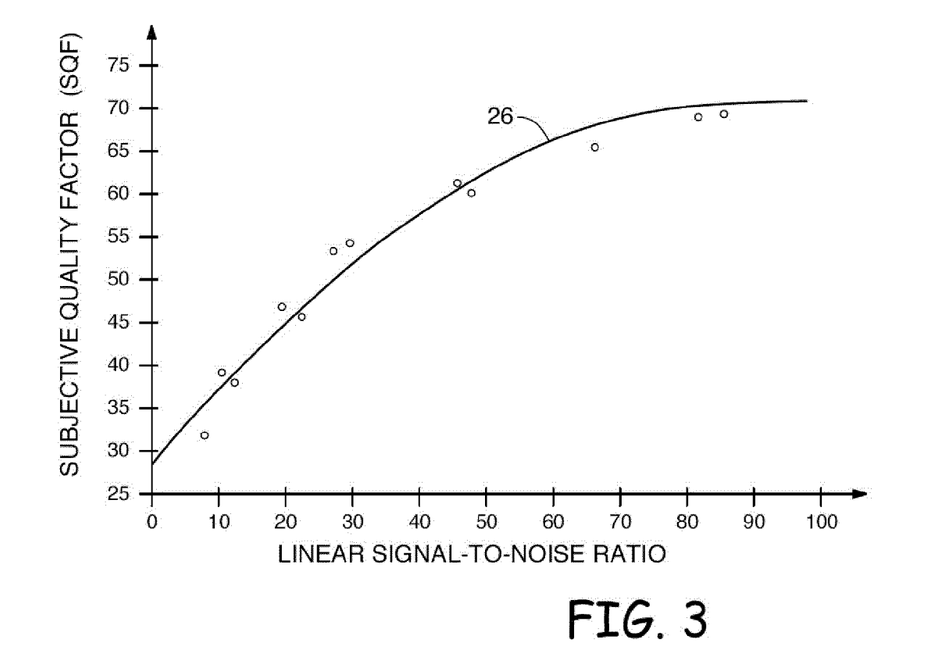
FIG. 3 is a diagram showing how the subjective quality factor (SQF) of an image area may be correlated with the signal-to-noise ratio of that area.

The good correlation that has been observed between measured signal-to-noise ratio and subjective-quality factor is illustrated in the graph of FIG. 3. As shown in FIG. 3, data points (represented by circles in the graph) tend to follow a well-behaved characteristic, such as the characteristic represented by line 26. This characteristic demonstrates that the subjective quality factor of a given portion of a captured image may be estimated based oh its measured signal-to-noise ratio.

Figure 4:
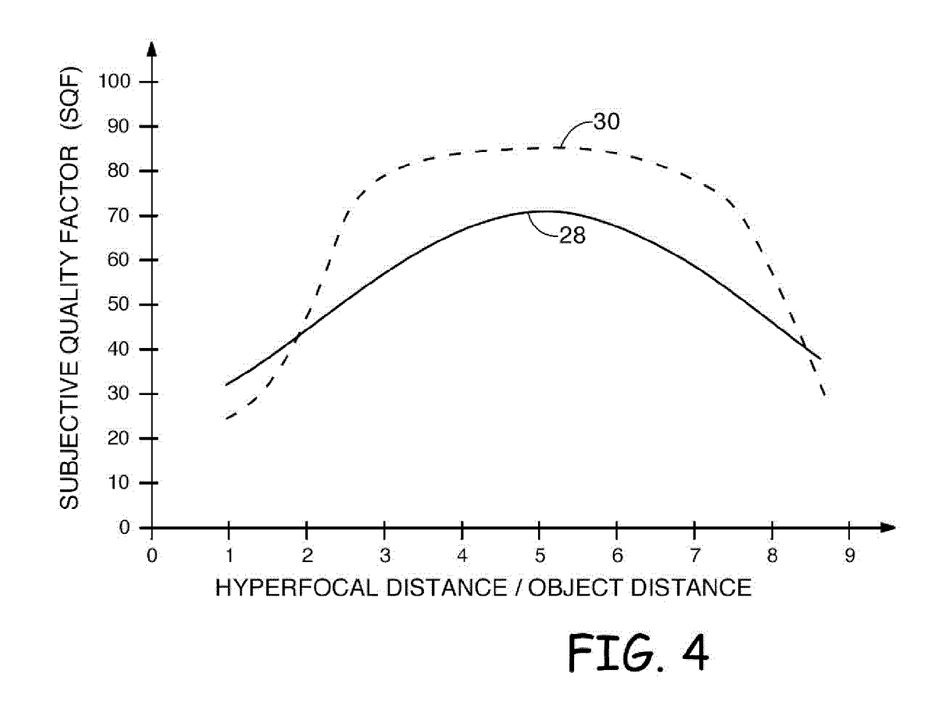
FIG. 4 is a graph showing how image processing techniques may be used to enhance the depth of field of an image in accordance with an embodiment of the present invention.

FIG. 4 shows how depth of field in an image may be enhanced using this type of digital image processing technique. Solid line 28 represents the subjective quality factor of a captured image before processing. After processing, the image has the subjective quality factor characteristic represented by dashed line 30. Dashed line 30 covers a wider range of distances around the point of maximum sharpness and generally exhibits higher subjective quality factor values than solid line 28. This indicates that the sharpening process has successfully increased the depth of field for the image. Flatter SQF curves have the appearance of being sharp over a wider range of distances than SQF curves with prominent maximums, because of the way in which viewers commonly perceive depth of field. A modest amount of sharpness is sacrificed in portions of the image that have the highest signal-to-noise ratio in order to flatten the SQF characteristic, but when viewed by a user, the sacrificed sharpness is not noticed due to the relative sharpness re-normalization performed by the human visual system, as reflected in the conventional way in which depth of field tables and depth of field lens markings are made.

During image processing, an image may be evaluated one area at a time (e.g., block by block or line by line). As each image area is processed, the image processing algorithm computes its signal-to-noise ratio. Because of the correlation between signal-to-noise ratio and SQF described in connection with FIG. 3, areas with low signal-to-noise ratios and areas with high signal-to-noise ratios may be sharpened somewhat less than areas with intermediate signal-to-noise ratios. This boost in the amount of sharpening that is applied to portions of the image with moderate SQF values tends to flatten the SQF curve of the processed image, thereby enhancing depth of field. The relatively low amount of sharpening that is applied at lower signal-to-noise ratios may help avoid amplification of noise in areas where the noise would not be masked by a strong signal. If desired, smoothing may be performed instead of sharpening at low signal-to-noise ratios so that noise is not amplified in this way (e.g., smoothing may be applied whenever the signal-to-noise ratio falls below a predetermined threshold value).

Figure 5:
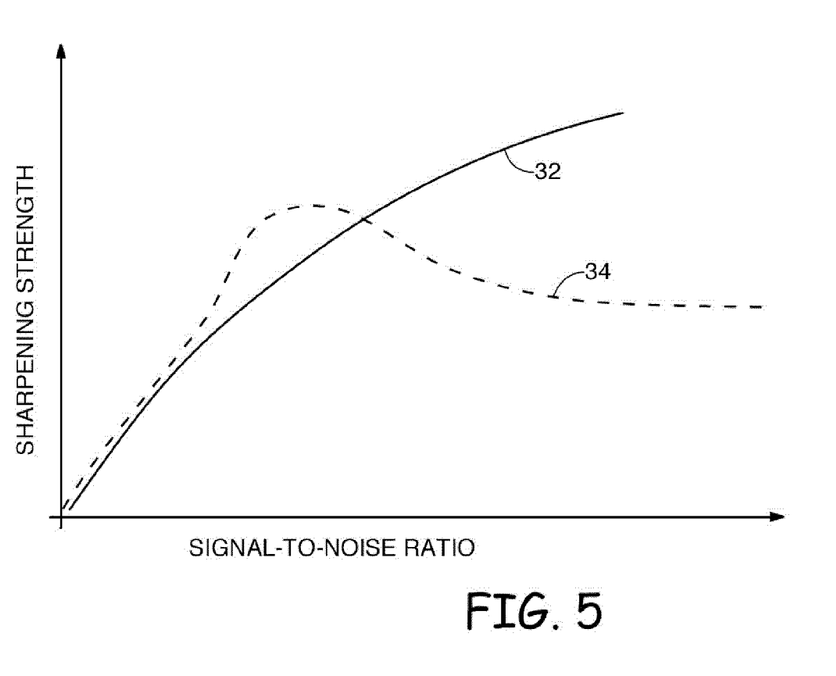
FIG. 5 is a graph showing how image processing algorithm parameters such as sharpening strength may be varied as a function of signal-to-noise ratio with conventional techniques and in image processing techniques in accordance with an embodiment of the present invention.

The way in which sharpening strength may be varied as a function of measured signal-to-noise ratio is shown in FIG. 5. In the graph of FIG. 5, solid line 32 represents that amount of sharpening that is applied during conventional image restoration processing. As the monotonic shape of solid line 32 makes clear, larger measured signal-to-noise ratios result in correspondingly larger sharpening strengths. Dashed line 34 represents a sharpening strength versus measured signal-to-noise ratio characteristic that may be used to enhance depth of field. At low signal-to-noise ratios, sharpness strength characteristic 34 has a positive slope and the amount of sharpening that is applied may be comparable to that used in conventional techniques. At intermediate signal-to-noise levels, curve 34 is elevated with respect to conventional curve 32. At higher signal-to-noise levels, sharpness strength characteristic 34 exhibits a negative slope, so that at the highest signal-to-noise levels less sharpening is applied than at intermediate signal-to-noise ratios. The boosted sharpening strength at intermediate signal-to-noise levels and the relatively lower sharpening strength at higher signal-to-noise levels elevates the SQF values of those portions of the captured image that are near the plane of focus more than the SQF value is elevated at the point of maximum focus. As described in connection with FIG. 4, this flattens the SQF curve and increases the depth of field of the image.

Image processing operations for enhancing depth of field may be performed by storage and processing circuitry 16 using dedicated image processing hardware and/or more general purpose hardware that is executing code. If desired, image processing functions may be performed using an application implemented on computing equipment 18 (e.g., instead of or in addition to processing the image with storage and processing circuitry 16). For clarity, arrangements in which image processing functions are implemented using storage and processing circuitry 16 in device 10 are sometimes described herein as an example.

In a typical scenario, image sensor 14 is used to capture an image. This image is processed to enhance depth of field and perform other image processing operations by storage and processing circuitry 16. The processed image may then be stored in storage and processing circuitry 16. The stored version of the processed image may be conveyed to computing equipment 18 over path 20 (e.g., to view on a display). The processed image may also be retained in storage and processing circuitry 16.

Figure 6:
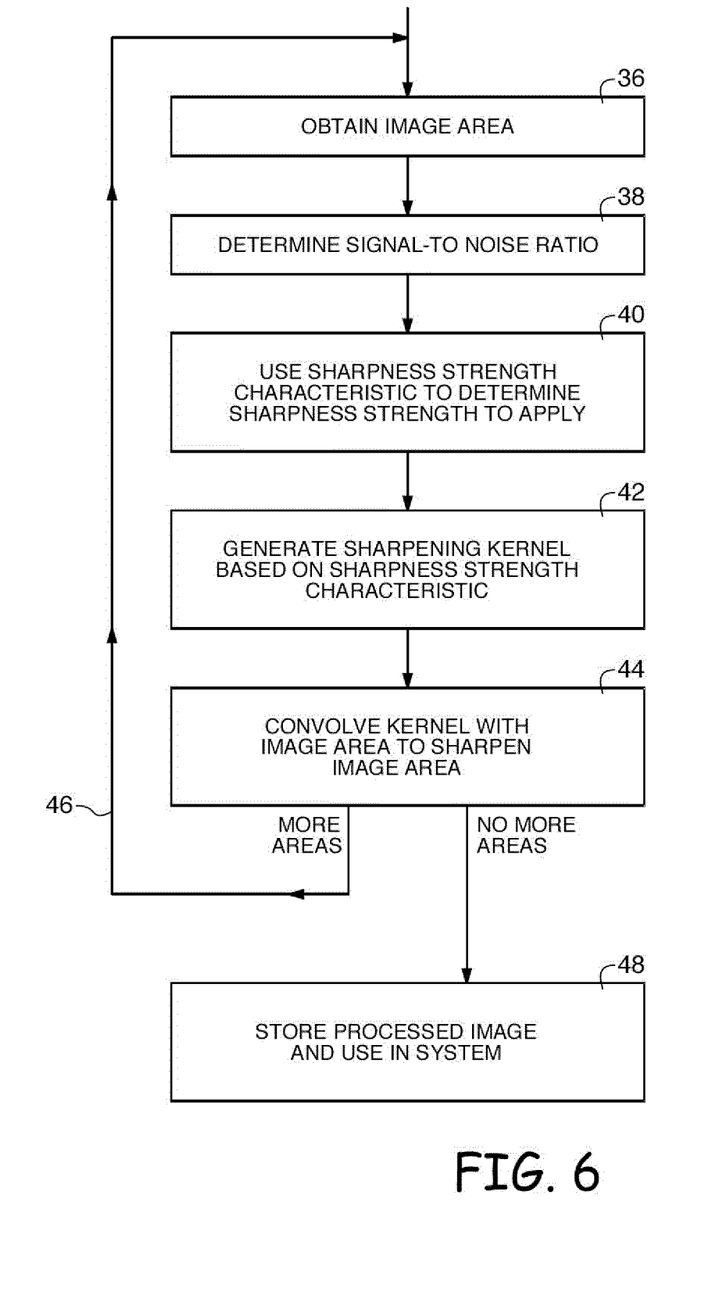
FIG. 6 is a flow chart of illustrative steps involved in varying sharpening strength as a function of signal-to-noise ratio of an image area to enhance depth of field in an image in accordance with an embodiment of the present invention.

Illustrative steps involved in selectively sharpening a captured image to enhance depth of field are shown in FIG. 6.

At step 36, storage and processing circuitry 16 may obtain an image area for processing. The image area may be a subset of the larger captured image. For example, the image area may correspond to a rectangular block of pixels having a given width and a given height or may correspond to a line of pixels in the sensor array.

At step 38, storage and processing circuitry 16 may calculate the signal-to-noise ratio of the image area.

At step 40, storage and processing circuitry 16 may use predetermined sharpness strength characteristic such as the characteristic represented by curve 34 in FIG. 5 to identify an appropriate sharpness strength to apply to the current image area.

At step 42, a kernel for the sharpening algorithm may be generated by storage and processing circuitry 16 based on the sharpness strength that was identified at step 40.

At step 44, the kernel that was generated during the operations of step 42 may be convolved with the image area to sharpen the image area.

As indicated by line 46, if more image areas remain to be processed, control can loop back to step 36. If the entire image has been processed, image processing operations are complete and the resulting enhanced depth-of-field image can be stored in storage and processing circuitry 16 and used in system 10 (step 48). For example, the stored version of the processed image may be transmitted to equipment 18 over path 20 to display to a user or to print out using a printer in equipment 18. Computing equipment 18 may also be used to store the processed image.

In the example of FIG. 6, image processing operations involved selectively sharpening different regions of an image based on the signal-to-noise ration of each region and curve 34 (i.e., the sharpness strength characteristic). If desired, image processing operations may involve both sharpening and smoothing. Smoothing operations, which are sometimes referred to as denoising operations, may be performed in noisy portions of an image to help lower perceived noise. When both sharpening and smoothing operations are performed on the same image, the amount of sharpening and smoothing that is applied can be varied for each image area. Image areas with high signal-to-noise ratios are appropriate for sharpening. Areas with low signal-to-noise ratios are appropriate for smoothing. Both smoothing and sharpening can also be performed on the same area (e.g., using a weighting scheme).

When performing convolution-based sharpening and smoothing operations, the amount of sharpening and smoothing that is performed depends on the kernel size and the value of the kernel coefficients. Kernel size and coefficient values are sometimes referred to collectively as kernel parameters. The sharpness strength characteristic of curve 34 (FIG. 5) is an example of a kernel parameter characteristic where the parameter is represented generically as a "strength." This type of curve shape can be used when determining how to adjust kernel size and coefficient values in an image processing algorithm in which both sharpening and smoothing operations are being performed. For example, lower y-values of the y-axis of FIG. 5 may correspond to smoothing, passing through a neutral point where the image is relatively unaffected, and continuing to higher y-values corresponding to increased strengths of sharpening.

Figure 7:
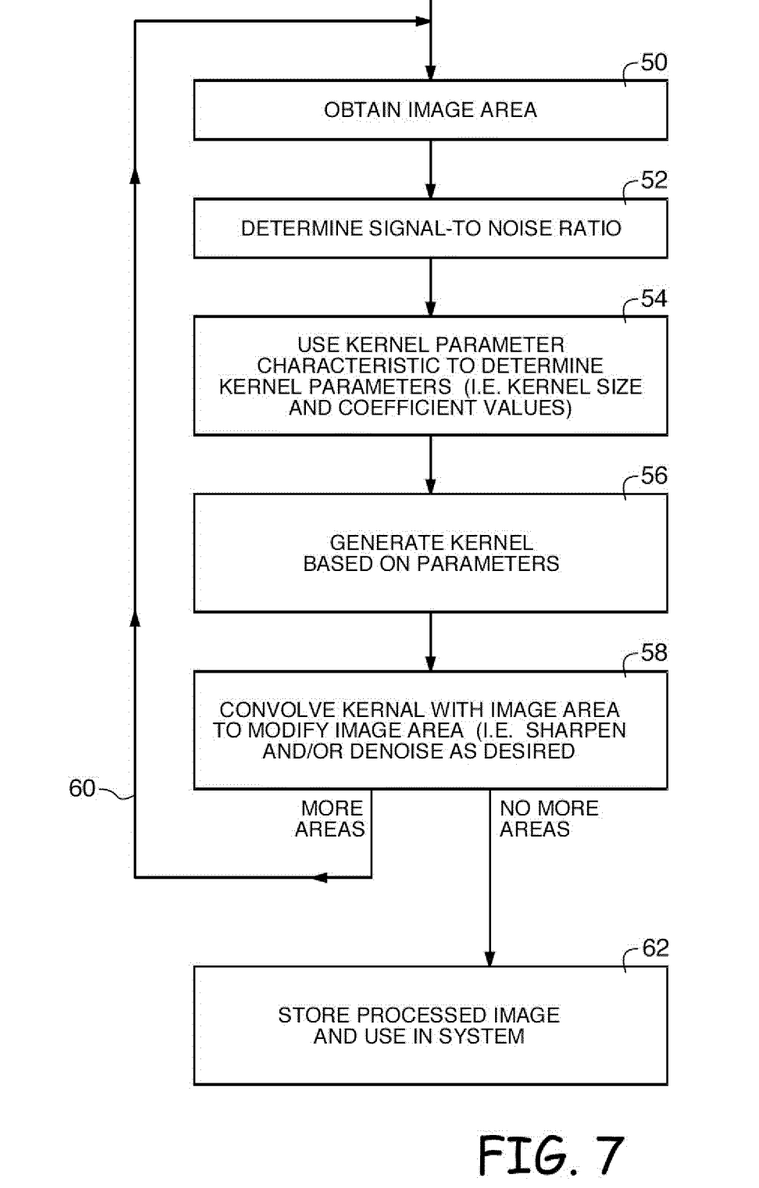
FIG. 7 is a flow chart of illustrative steps involved in varying kernel parameters as a function of the signal-to-noise ratio of an image area and a kernel parameter characteristic to enhance depth of field in an image in accordance with an embodiment of the present invention.

Illustrative operations involved in performing image processing operations in which kernel parameters are adjusted in this way are shown in FIG. 7.

As with the processing operations of FIG. 6, the processing operations of FIG. 7 may begin with the process of capturing an image from image sensor 14 and providing storage and processing circuitry 16 with an area of the image (step 50). The area of the image that is obtained at step 50 may be a line of the image, a rectangular section of the image, or other image area.

At step 52, storage and processing circuitry 16 may process the obtained image area to calculate the signal-to-noise ratio of the obtained image area.

At step 54, storage and processing circuitry 16 may use a predetermined kernel parameter characteristic such as the characteristic represented by curve 34 in FIG. 5 to identity how each kernel parameter is to be varied. The image processing kernel parameters include kernel size and coefficient values. With this type of arrangement, the operations of step 54 serve to identify the kernel size and kernel coefficient values to be used during subsequent image processing operations on the current image area. The kernel parameter characteristic that is used in selecting the magnitudes of the kernel size and coefficients based on the measured signal-to-noise ratio for the image area may have a curve shape such as the shape of curve 34 of FIG. 5 (i.e., a curve with both positive and negative slopes and a peak at intermediate signal-to-noise values). This allows image areas with the highest and lowest signal-to-noise ratios in the unprocessed image to receive relatively less sharpening or even more smoothing, while allowing image areas with intermediate values of signal-to-noise ratio to receive relatively more sharpening. The applied sharpness strength therefore peaks at an intermediate signal-to noise ratio, rather than exhibiting the monotonic characteristic of conventional image restoration algorithms of the type represented by conventional curve 32 of FIG. 5. If desired, the kernel parameter characteristic (and sharpening strength characteristic of FIG. 6) may be stored in registers or other storage in circuitry 16 that facilitates rapid access during processing.

At step 56, after identifying which values to use for the kernel parameters (kernel size and coefficient values); the kernel that is to be used in processing the obtained image area can be generated by storage and processing circuitry 16.

At step 58, the kernel that was generated during the operations of step 54 may be convolved with the image area that is currently being processed to modify that image area (i.e., to sharpen and smooth the current image area) according to the selected kernel parameters. If the image area has a moderate signal-to-noise ratio, a relatively large amount of sharpening will be performed. If the image area has a larger or smaller signal-to-noise ratio, less sharpening or even smoothing will be performed.

As indicated by line 60, if more areas remain to be processed, control can loop back to step 50. Once the entire image has been processed to produce the enhanced depth-of-field image, the processed image can be stored in storage and processing circuitry 16 and used in system 10 at step 62. As with the selective sharpening operations of FIG. 6, the processing operations of FIG. 7 tend to increase perceived depth of field. For example, if the captured image originally had a SQF curve such as curve 28 of FIG. 4, following processing using the operations of FIGS. 6 and 7, the processed image may exhibit an enhanced depth of field as illustrated by curve 30 of FIG. 4.

During the operations of step 62, the processed image may be transmitted to equipment 18 over path 20 to display to a user or to print out using a printer in equipment 18. Computing equipment 18 may also be used to store the processed image. If desired, computing equipment 18 may be used to implement the image processing operations of FIGS. 6 and 7 (e.g., using stand-alone image processing applications).

Various embodiments have been described illustrating an electronic device with an image sensor that captures digital images. Multiple areas of a captured image may be individually processed. Each area of the image may be processed to determine its signal-to-noise ratio. The storage and processing circuitry can determine how much a given area should be sharpened (or smoothed) based on the computed signal-to-noise ratio and predetermine kernel parameter characteristics (e.g., a sharpness strength versus signal-to-noise ratio characteristic curve). Areas in an image that have the lowest and highest signal-to-noise ratios may be sharpened less than areas in the image with intermediate signal-to-noise ratios. This flattens the subjective quality factor curve of the processed image and enhances the perceived depth of field of the image.

The foregoing is merely illustrative of the principles of this invention which can be practiced in other embodiments.

What is claimed is:

1. An electronic device comprising:
an image sensor that captures an image that includes n image areas, wherein n is at least one;
storage and processing circuitry that manipulates depth of field in the image by processing the image, wherein the storage and processing circuitry is configured to manipulate the depth of field of the image by:
calculating an inferred defocus metric for each of the n image areas;
for x of the n image areas, sharpening each of the x image areas by an amount the depends on the calculated inferred defocus metric for that image area, wherein the storage and processing circuitry is configured to determine how much sharpening to apply to each of the x image areas using a stored sharpness strength characteristic that relates sharpening strength to image area signal-to-noise ratio values and that has both positive and negative slopes; and
for y of the n image areas, smoothing each of the y image areas by an amount the depends on the calculated inferred defocus metric for that image area, wherein the storage and processing circuitry is configured to determine how much smoothing to apply to each of the y image areas using the stored sharpness strength characteristic, wherein the sum of x and y is n, wherein x is no less than zero and no greater than n, and wherein y is no less than zero and no greater than n.

2. An electronic device comprising:
an image sensor that captures an image that includes multiple image areas;
storage and processing circuitry that manipulates depth of field in the image by processing the image, wherein the storage and processing circuitry is configured to manipulate the depth of field of the image by:
calculating an inferred defocus metric for each image area; and
sharpening at least some of the image areas by an amount that depends on the calculated inferred defocus metric for each image area, wherein the image areas comprise a first image area that has a first signal-to-noise ratio, a second image area that has a second signal-to-noise ratio, and a third area that has a third signal-to-noise ratio, wherein the first signal-to-noise ratio is less than the second signal-to-noise ratio, wherein the second signal-to-noise ratio is less than the third signal-to-noise ratio, and wherein the storage and processing circuitry is configured to sharpen the second image area more than the first and third image areas.

3. A method for using storage and processing circuitry to process an image captured by an image sensor in an electronic device, wherein the image has multiple image areas, the method comprising:
calculating a respective inferred defocus metric value for each image area using the storage and processing circuitry;
with the storage and processing circuitry, enhancing depth of field of the image by sharpening each image area by an amount that depends on the inferred defocus metric for that image area; and
determining how much sharpening to apply to each image area using a sharpness strength characteristic that relates sharpening strength to signal-to-noise ratio values for the image areas and that has both positive and negative slopes.

4. The method defined in claim 3 wherein the storage and processing circuitry comprises storage and processing circuitry in an electronic device, the method further comprising convolving a kernel with each image area to perform the sharpening of that image area.

5. The method defined in claim 3 wherein the image has at least one additional image area, the method further comprising:
calculating a respective inferred defocus metric value for each additional image area using the storage and processing circuitry;
with the storage and processing circuitry, enhancing depth of field of the image by smoothing each additional image area by an amount that depends on the inferred defocus metric for that image area; and
determining how much smoothing to apply to each additional image area using the sharpness strength characteristic.

6. The method defined in claim 3 wherein the image has at least one additional image area, the method further comprising:

determining that each additional image area has a signal-to-noise ratio that falls below a predetermined threshold value; and with the storage and processing circuitry, enhancing depth of field of the image by smoothing each additional image area by at least some amount.

7. A method for using storage and processing circuitry to process an image captured by an image sensor in an electronic device, wherein the image has multiple image areas, the method comprising:

calculating a respective inferred defocus metric value for each image area using the storage and processing circuitry; and with the storage and processing circuitry, enhancing depth of field of the image by sharpening each image area by an amount that depends on the inferred defocus metric for that image area, wherein the image areas comprise a first image area that has a first signal-to-noise ratio, a second image area that has a second signal-to-noise ratio, and a third area that has a third signal-to-noise ratio, wherein the first signal-to-noise ratio is less than the second signal-to-noise ratio, wherein the second signal-to-noise ratio is less than the third signal-to-noise ratio, and wherein sharpening comprises sharpening the second image area more than the first and third image areas.

* * * * *